Figure 3:
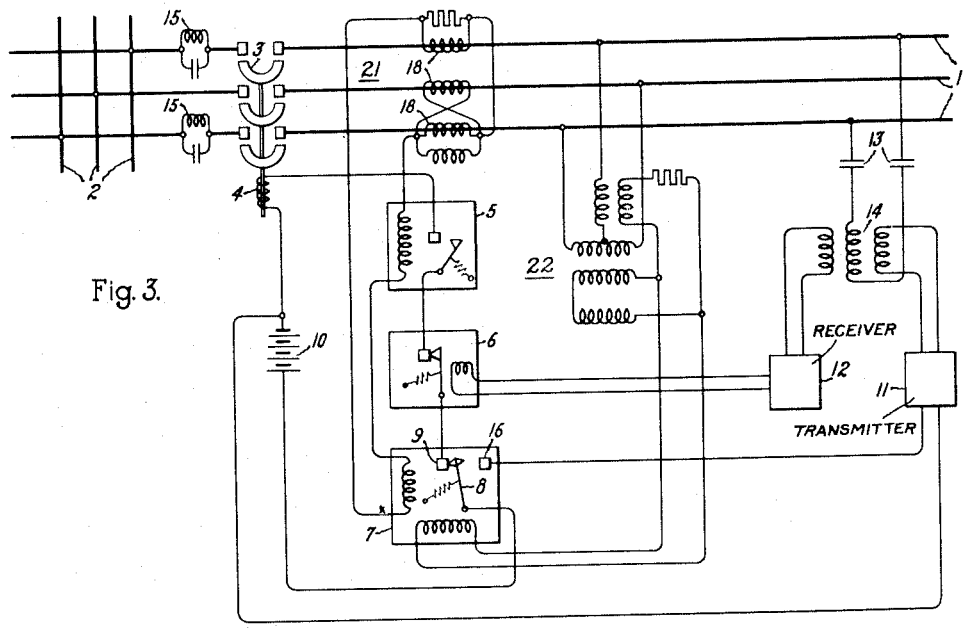

March 30, 1937.  J. FALLOU  2,075,709
SELECTIVE PROTECTIVE DEVICE FOR ELECTRIC LINES
Filed June 2, 1931  2 Sheets-Sheet 1
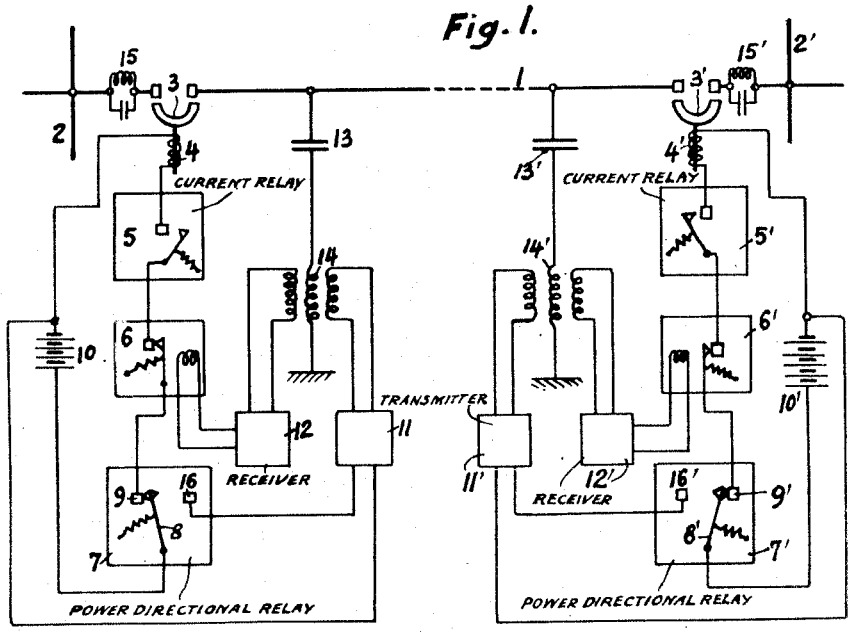
Fig. 1.
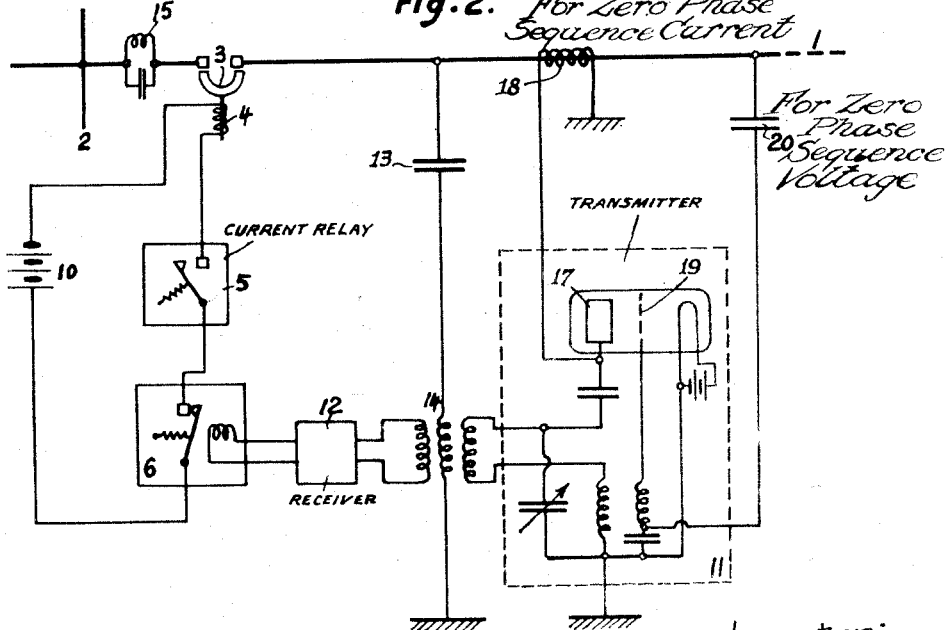
Fig. 2. For Zero Phase Sequence Current
For Zero Phase Sequence Voltage
Inventor:
Jean Fallou,
by Charles A. Fallou
His Attorney.

March 30, 1937.  J. FALLOU  2,075,709

SELECTIVE PROTECTIVE DEVICE FOR ELECTRIC LINES

Filed June 2, 1931  2 Sheets-Sheet 2

Inventor:
Jean Fallou,
by Charles E. Mullen
His Attorney.

Patented Mar. 30, 1937

2,075,709

UNITED STATES PATENT OFFICE 2,075,709

SELECTIVE PROTECTIVE DEVICE FOR ELECTRIC LINES

Jean Fallou, Paris, France, assignor to General Electric Company, a corporation of New York Application June 2, 1931, Serial No. 541,652
In France June 5, 1930

19 Claims. (Cl. 175—294)

In electric power distribution systems, the stations and substations are interconnected by aerial or underground lines generally termed feeders. If a short circuit occurs, or if a wire is earthed or broken, it is necessary to isolate only the faulty portion as quickly as possible.

It has been proposed, in order to obtain such a selective protection, to use high frequency currents which are superimposed on the working currents of the feeder and whose action on the releasing parts of the circuit breakers disposed at the ends of the feeder is controlled by wattmeter relays operated by the energy supplied or received by the feeder at its ends.

The object of the present invention is to provide selective protective devices, which while using high frequency currents superimposed on the working current of the feeder, yet differ from known devices in that the high frequency currents are transmitted only when a fault occurs on the corresponding feeder, the transmission being started by relay operation caused by the disturbance of balance, or the operation of the transmitter being directly controlled by the out-of-balance which appears on the feeder when the fault occurs.

It is well known that, if a fault occurs in a three-phase line, the currents and/or voltages can no longer be represented by vectors equal and displaced from each other by 120°, but are represented by a system of vectors similar to two balanced systems, that is one in which the phases succeed each other directly and another in which they succeed each other in the reversed direction, and by a system of three equipollent vectors termed an asymmetrical or residual system. These three systems are also known as the positive, negative and zero phase sequence systems respectively.

Corresponding to these three systems of currents and voltages, there are the respective powers, termed direct symmetrical or positive phase sequence, reverse symmetrical or negative phase sequence, and asymmetrical or zero phase sequence powers, which can be separated.

It is also known that when a fault occurs, the reverse symmetrical and the asymmetrical powers seem to come from the faulty point and to flow towards the balanced elements, energy receivers or generators of the system.

A feature of my invention consists in inserting at each end of the considered line or feeder, in the circuit of the circuit-breaker releasing or trip coil, a relay which opens the circuit and thus prevents the opening of the circuit breaker, when the direction of the reverse or the asymmetrical power at both ends of the protected section of line shows that the fault is outside of this section. This lock-out relay is energized by high frequency waves or oscillations superimposed on the line by means of generating devices which are installed at each end of the section. Also in accordance with my invention the production and transmission of the high frequency current may be started only when the directions in which the reverse or asymmetrical powers flow are those corresponding to the case of a fault situated outside of the line section to be protected.

My invention will be better understood from the following description when considered in connection with the accompanying drawings and its scope will be pointed out in the appended claims.

Figure 4:
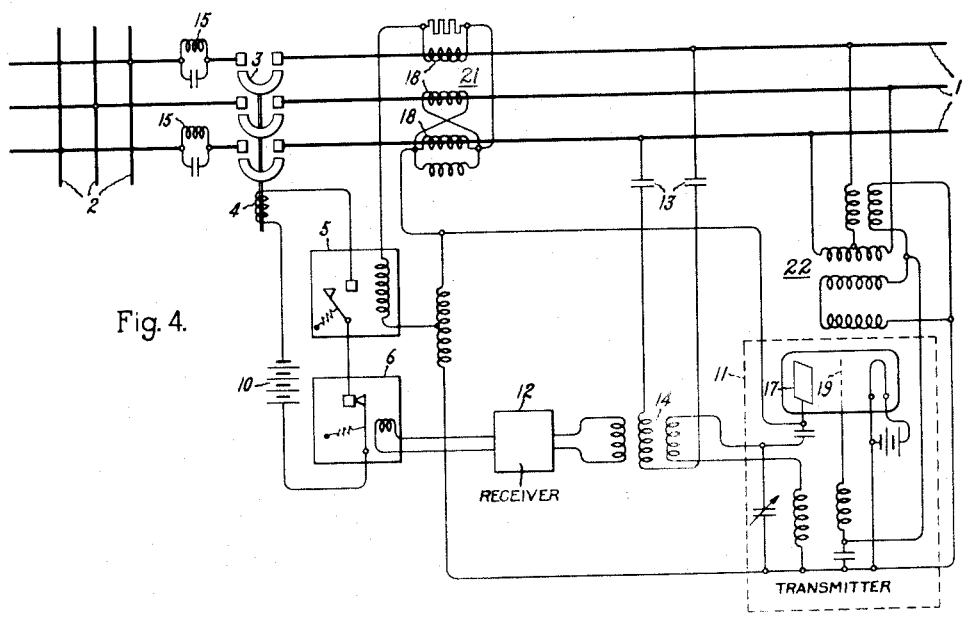

In the accompanying drawings, Fig. 1 illustrates diagrammatically one embodiment of my invention, Fig. 2 illustrates diagrammatically another embodiment of my invention and Figs. 3 and 4 illustrate diagrammatically one arrangement for obtaining the excitations of the protective apparatus at one end of a section as applied to the embodiments of my invention shown in Figs. 1 and 2 respectively.

In Fig. 1, the power line 1 to be protected is represented schematically by a single line for clearness, though it is to be understood that it is a polyphase line. The modifications which must be made for that reason in the drawings will be obvious to anyone skilled in the art to which my invention pertains. The line 1 extends between the bus bars 2 and 2' of two stations more or less distant from each other.

At the ends of the line 1 are inserted circuit breakers 3 and 3', each provided with an automatic opening device actuated by coils 4 and 4'. At the ends of the line are mounted current relays 5 and 5' whose exciting windings, fed by current transformers inserted in the line, have for the sake of clearness been omitted from the figure. These relays close their contacts, either when the current in a feeder phase exceeds a predetermined value or preferably when, on the occurence of a fault, a reverse symmetrical component or an asymmetrical component of current appears. In any case, the connections of the current relays 5, 5' for the desired energizations will be obvious to those skilled in the art to which my invention pertains. As a matter of example, however, an arrangement of current relays responsive to phase currents and a relay responsive to an asymmetrical component of current is shown in United States Letters Patent 1,718,448 while arrangements of relays responsive to the reverse symmetrical component are disclosed in United States Letters Patent 1,531,601 and 1,674,477, but for the sake of simplicity and illustration I have shown in Fig. 3 a reverse or negative phase sequence current network 21 such as is shown and described in United States Letters Patent 1,535,624. Further, two relays 6 and 6' are provided, the contacts of which are normally closed. The relay 6 opens its contacts when the station 2' supplies a high frequency current to the feeder and the relay 6' opens its contacts when the station 2 supplies a high frequency current to the same feeder. It is immaterial whether the relay 6 opens or does not open its contacts when the station 2 supplies its own high frequency currents. In the same way, it is not harmful if relay 6' is energized when station 2' supplies its own high frequency current.

Finally, two relays 7 and 7' are provided which are directional wattmeter relays of any type well known to those skilled in the art to which my invention pertains, but the connections of their cooperating windings, not represented on the diagram for clearness, may be such that they are actuated only by the reverse symmetrical or asymmetrical component of the power flowing in the circuit at each of the stations 2 and 2'. The connections of the power directional relays 7, 7' will be obvious to those skilled in the art to which my invention pertains but as a matter of example arrangements of wattmeter type relays responsive to the reverse symmetrical component of power are disclosed in United States Letters Patent 1,535,587 and 1,816,729 while arrangements of wattmeter type of relays responsive to the asymmetrical component of power are shown in United States Letters Patent 1,554,704 and 1,731,372. However, for the sake of simplicity and illustration I have shown in Fig. 3 reverse or negative phase sequence current and voltage networks 21 and 22 respectively, such as are shown and described in United States Letters Patent 1,535,624.

When the currents and potentials are normal, the movable contacts 8 and 8' of the wattmeter relays 7 and 7' are pulled by a spring respectively against the stationary contacts 9 and 9'. These contacts 9 and 9' are connected to the normally closed contacts of the relays 6 and 6', whose contacts are connected respectively to the normally open contacts of the relays 5 and 5'. The releasing coils 4 and 4' are each connected to the relays 5 and 5' and, at each of the stations 2 and 2', local batteries 10 and 10' can feed the coils 4 and 4' respectively when all the relays have their contacts closed.

At each of the stations 2 and 2', there are also transmitting devices 11 and 11' adapted to generate high frequency currents, and devices 12 and 12' adapted to receive said high frequency currents. These generators and receivers may be of any suitable kind, examples of which are well known in the art to which my invention pertains. They are connected to the line or to the feeder by suitable coupling devices, such as condensers 13 and 13'.

Each receiver 12 and 12', when it receives a current of suitable frequency, energizes one of the relays 6 or 6', in order to effect the opening of its contacts.

Transformers for coupling the transmitters and receivers to the coupling devices 13 and 13' are diagrammatically represented at 14 and 14'. Plug or trap circuits, of well known type, are provided at 15 and 15', in order to prevent the propagation of high frequency current beyond the line to be protected.

The working of the transmitters 11 and 11' is controlled by the power directional or wattmeter relays 7 and 7', when said relays are in inoperative positions; that is, when their movable contacts 8 and 8' are in contact with the stationary contacts 9 and 9', the feeding circuit of the transmitters 11 and 11' is open, and there is no production of high frequency currents.

As soon as the relays 7 or 7' operate so that their movable contacts 8 or 8' touch the contacts 16 or 16', the energizing circuit of the corresponding transmitter is closed and the high frequency current begins to be supplied.

The energizing circuits for each of the relays 7 and 7' are such that the movable contacts 8 and 8' remain on the stationary contacts 9 and 9' as long as the reverse symmetrical or residual power flows from the feeder toward the bus bars of the corresponding station 2, 2'. On the other hand, the movable contacts 8 and 8' are drawn against the contacts 16 and 16' when the reverse symmetrical or the asymmetrical power flows from the bars of the stations 2 and 2' towards the feeder.

The operation of this embodiment of my invention is as follows:—

Normally, when no fault exists, the relays 5 and 5' have their contacts open and the releasing coils 4 and 4' receive no current, the wattmeter relays are in the inoperative position shown and no high frequency current is supplied.

If a fault occurs inside the protected feeder, between the stations 2 and 2', the reverse symmetrical or asymmetrical power component flows from the feeder towards the bars. In this event, the wattmeter relays 7 and 7' remain in the inoperative position shown, the movable contacts 8 and 8' remain on the contacts 9 and 9', and no high frequency current is produced. Consequently, the relays 6 and 6' remain closed. Also the relays 5 and 5' close their contacts and the releasing coils 4 and 4' are energized. The feeder thus becomes disconnected at both ends.

It will be assumed now that a fault occurs on the network, but outside of the portion between the stations 2 and 2', for example to the right of station 2'. At the station 2, the reverse symmetrical or the asymmetrical power component flows from the feeder towards the bus bars, but at the station 2' it flows from the bars toward the feeder. Thereupon, the wattmeter movable contact 8' of the relay 7' comes into contact with the contact 16' and thus the production of high frequency current is started. This current causes the relay 6 at station 2 to open its contacts and also the relay 6' in station 2', and neither of the circuit breakers 3 or 3' is opened even though the current relays 5 and 5' close their contacts.

It may be remarked that since, in regard to the operation of the device, it is a case of complete operation or none at all, no precision is necessary in the working of the different relays nor nice adjustments. The energizing circuits of the relays can be supplied by current or voltage reducers of any kind, such as transformers for the current or condensers for the potential. It is advantageous to use wattmeter relays 7 operating as quickly as possible, but current relays having a slight time delay, for example one tenth of a second. The purpose of this is to ensure operation of the receiver relay prior to the operation of the overcurrent relay when external faults occur. Also with the relays 5 and 7 operated by out-of-balance components which appear only when a fault occurs, the arrangement may be made as sensitive as desired, and is able to function with fault currents much lower than the normal current.

In the embodiment of my invention shown in Fig. 2, the apparatus at only one end of the line is diagrammatically illustrated, the apparatus at the other end being exactly the same.

In this arrangement, the wattmeter relay of Fig. 1 is eliminated, and the high frequency generator or transmitter 11, represented by a three-electrode vacuum tube, is itself arranged in such a manner that it starts only if the reverse symmetrical or the asymmetrical power progresses from the bars 2 towards the feeder 1, thus indicating that the fault is not on the protected feeder. For this purpose, the voltage on the plate 17 of the generator can be supplied by the current transformers of the feeder, connected in such a way, or provided with filters so disposed as is well known in the art to which my invention pertains, that the voltage depends only on the reverse symmetrical or the asymmetrical component of the currents in the feeder 1 also. In the feeder shown by a single line in Fig. 2, the current transformers are schematically represented by the winding 18, which as shown indicates an output proportional to the sum of the line currents, that is the residual or zero phase sequence component of current. On the other hand, a voltage proportional either to the reverse symmetrical or to the asymmetrical component of the line voltages can be applied to the grid 19 of the vacuum tube, which is itself coupled by any known means with the oscillating circuit of the generating device. In Fig. 4 I have shown for the sake of simplicity and illustration negative phase sequence current and voltage networks 21 and 22 respectively, such as are shown and described in United States Letters Patent 1,535,624. These provide the desired excitations for the relay 5 and the anode and grid of the electric discharge valve 19.

In Fig. 2, the single condenser 20 represents schematically the system used to take off one of the potential components and as shown would represent the sum of the line conductor voltages to ground, that is the asymmetrical or zero phase sequence component of voltage.

The direction of the windings of the transformers 18 and the phase of the voltage supplied thereby to the plate 17 are adjusted in such a way that if, for example, the asymmetrical power component flows from the line 1 towards the bars 2, the plate voltage will be negative when the voltage applied to the grid is positive.

Since the generator can work only when the plate is positive, it will remain inoperative as long as the chosen power component flows from the line 1 towards the bars 2. On the contrary, when the filtered power component flows from the bar 2 towards the line 1, the voltages applied to the grid and to the plate will be simultaneously positive or negative and at each half cycle of the current produced by the fault, the generator will start working and will supply the line with wave trains which will effect the opening of the contacts of the locking relays 6, 6'.

What I claim is:

1. A protective arrangement for an electric circuit including circuit interrupting means at one end of a portion of the circuit, fault responsive means connected to be energized from said circuit for controlling the circuit opening operation of said interrupting means on the occurrence of a fault on the circuit, means at the other end of said circuit portion for transmitting an oscillation of a predetermined frequency on the occurrence of negative phase sequence power flow in a predetermined direction in said circuit portion including negative phase sequence power responsive means, receiving means at said one end tuned to the frequency of said transmitting means and means controlled by said receiving means for preventing said fault responsive means from controlling the opening of said circuit interrupting means when the fault is outside of said circuit portion.

2. A protective device for electric feeders comprising a circuit breaker at one end of the feeder to be protected, a releasing coil for actuating said circuit breaker, a high frequency current transmitting means coupled to the feeder at the other end thereof, receiving means at the end of the feeder where the circuit breaker is located tuned to the frequency of said transmitting means and coupled to the feeder, means for controlling the circuit of the circuit breaker releasing coil including a plurality of relays having their contacts connected in series relation, one of said relays being an overcurrent relay connected to be energized in accordance with the negative phase sequence component of the power current of the circuit and to close its contacts when said current exceeds a predetermined value and another of said relays being connected to be energized in accordance with the output current of the receiving means to open its contacts, and means for controlling the operation of the transmitting means in accordance with the negative phase sequence component of the power transmitted by the feeder.

3. A protective arrangement for an electric circuit including circuit interrupting means at one end of a portion of the circuit, fault responsive means connected to be energized in accordance with a phase sequence component of an electric quantity of the circuit for controlling the circuit opening operation of said interrupting means on the occurrence of a fault on the circuit, means at the other end of said circuit portion for transmitting an oscillation of a predetermined frequency on the occurrence of negative phase sequence power flow in a predetermined direction in said circuit portion including negative phase sequence power responsive means, receiving means at said one end tuned to the frequency of said transmitting means, and means controlled by said receiving means for preventing said fault responsive means from controlling the opening of said interrupting means when the fault is outside of said circuit portion.

4. A protective arrangement for an electric circuit including circuit interrupting means at one end of a portion of the circuit, fault responsive means connected to be energized in accordance with the negative phase sequence component of the current of said circuit for controlling the circuit opening operation of said interrupting means on the occurrence of a fault on the circuit, means at the other end of said circuit portion for transmitting an oscillation of a predetermined frequency over one of the conductors of the circuit, means for controlling the operation of said transmitting means in accordance with the direction of flow of the negative phase sequence component of the power in said circuit portion, receiving means coupled to said circuit at said one end and tuned to the frequency of said transmitting means and means controlled by said receiving means for preventing said fault responsive means from controlling the opening of said circuit interrupting means when the fault is outside of said circuit portion.

5. A protective arrangement for an electric circuit including circuit interrupting means at one end of a portion of the circuit, fault responsive means connected to be energized from said circuit for controlling the circuit opening operation of said interrupting means on the occurrence of a fault on the circuit, means at the other end of said circuit portion for transmitting an oscillation of a predetermined frequency over one of the conductors of the circuit, means for controlling the operation of said transmitting means in accordance with the negative phase sequence component of the circuit power, receiving means coupled to said circuit at said one end and tuned to the frequency of said transmitting means and means controlled by said receiving means for preventing said fault responsive means from controlling the opening of said circuit interrupting means when the fault is outside of said circuit portion.

6. A protective device for electric feeders comprising a circuit breaker at one end of the feeder to be protected, a releasing coil for actuating said circuit breaker, a high frequency current transmitting means coupled to the feeder at the other end thereof, receiving means at the end of the feeder where the circuit breaker is located tuned to the frequency of said transmitting means and coupled to the feeder, means for controlling the circuit of the circuit breaker releasing coil including a plurality of relays having their contacts connected in the circuit of said releasing coil, one of said relays being connected to be energized from the circuit for operation in accordance with the negative phase sequence component of the current of the circuit and another of said relays being connected to be energized in accordance with the output current of the receiving means and means for controlling the operation of the transmitting means in accordance with the direction of the negative phase sequence component of the power flow in the feeder.

7. A protective arrangement for an electric circuit including circuit interrupting means at one end of a portion of the circuit, fault responsive means connected to be energized in accordance with the negative phase sequence component of an electric quantity of the circuit for controlling the circuit opening operation of said interrupting means on the occurrence of a fault on the circuit, means at the other end of said circuit portion for transmitting current to said one end, means for controlling the operation of said transmitting means in accordance with the negative phase sequence component of the circuit power, and means connected to be controlled by said transmitted current for preventing said fault responsive means from controlling the opening of said circuit interrupting means when the fault is outside of said circuit portion.

8. A protective arrangement for an electric circuit including circuit interrupting means at one end of a portion of the circuit, fault responsive means connected to be energized from said circuit for effecting a circuit opening operation of said interrupting means on the occurrence of a fault on the circuit, means for transmitting current from the other end of said circuit portion to said one end on the occurrence of negative phase sequence power flow in a predetermined direction in said circuit portion including negative phase sequence power responsive means, and means connected to be controlled by said transmitted current when the fault is outside of said circuit portion for preventing said fault responsive means from effecting a circuit opening operation of said circuit interrupting means.

9. A protective arrangement for an electric circuit including circuit interrupting means at one end of a portion of the circuit, fault responsive means connected to be energized in accordance with the negative phase sequence component of the power current of said circuit for effecting a circuit opening operation of said interrupting means on the occurrence of a fault on the circuit, means for transmitting current from the other end of said circuit portion to said one end on the occurrence of negative phase sequence power flow in a predetermined direction in said circuit portion, and means connected to be controlled by said transmitted current when the fault is outside of said circuit portion for preventing said fault responsive means from effecting a circuit opening operation of said circuit interrupting means.

10. A protective arrangement for an electric circuit including circuit interrupting means at one end of a portion of the circuit, fault responsive means connected to be energized in accordance with the negative phase sequence component of the circuit current for effecting a circuit opening operation of said interrupting means on the occurrence of a fault on the circuit, directional responsive electric valve discharge means for transmitting under a predetermined circuit condition current from the other end of said circuit portion to said one end and means connected to be controlled by said transmitted current for preventing said fault responsive means from effecting an opening operation of said circuit interrupting means.

11. A protective arrangement for an electric circuit including circuit interrupting means at one end of a portion of the circuit, electroresponsive means for effecting the opening of said circuit interrupting means, means for transmitting under a predetermined circuit condition current from the other end of said circuit portion to said one end, means for controlling the circuit of said electroresponsive means including a plurality of relays having their contacts in series relation in the circuit of said electroresponsive means one of said relays being connected to be energized from the circuit for operation on the occurrence of a fault on the circuit, a second one of said relays being connected to be controlled by said transmitted current and a third one of said relays being connected to be energized in accordance with the negative phase sequence component of the circuit power at said one end.

12. A protective arrangement for an electric circuit including circuit interrupting means at one end of a portion of the circuit, electroresponsive means for effecting the opening of said circuit interrupting means, means for transmitting under a predetermined circuit condition current from the other end of said circuit portion to said one end, means for controlling the circuit of said electroresponsive means including a plurality of relays having their contacts in series relation in the circuit of said electroresponsive means one of said relays being connected to be energized from the circuit for operation on the occurrence of a fault on the circuit, a second one of said relays being connected to be controlled by said transmitted current and a third one of said relays being connected to be energized in accordance with the negative phase sequence component of the circuit power at said one end and means for controlling the operation of said transmitting means in accordance with the direction of the negative phase sequence component of power flow at said other end.

13. A protective arrangement for an electric circuit including circuit interrupting means at one end of a portion of the circuit, fault responsive means at said end for effecting a circuit opening operation of said interrupting means on the occurrence of a fault on the circuit including a time action overcurrent relay connected to be energized from the circuit, means at the other end of said circuit portion for transmitting a current to said one end of said circuit portion only on the occurrence of a fault outside of said circuit portion and means at said one end responsive to said transmitted current and operative within the time action of said overcurrent relay for preventing said fault responsive means from effecting a circuit opening operation of said circuit interrupting means.

14. A protective arrangement for an electric circuit including circuit interrupting means at one end of a portion of the circuit, fault responsive relay means for controlling the circuit opening operation of said interrupting means on the occurrence of a fault on the circuit including a time action overcurrent relay connected to be energized from the circuit, means at the other end of said circuit portion for transmitting an oscillation of a predetermined frequency, power directional relay means at the other end of said circuit for controlling the operation of said transmitting means in accordance with the direction of flow of the circuit power at said end, receiving means at said one end tuned to the frequency of said transmitting means and means controlled by said receiving means and operative within the time action of said overcurrent relay for preventing said fault responsive means from effecting the opening of said circuit interrupting means when the fault is outside of said circuit portion.

15. A protective arrangement for a polyphase alternating current circuit including circuit interrupting means at one end of a portion of the circuit, fault responsive means connected to be energized from said circuit operative only on the occurrence of a phase unbalance condition of the circuit for effecting a circuit opening operation of said interrupting means, means for transmitting current from the other end of said circuit portion to said one end on the occurrence of power flow in a predetermined direction at said other end and means connected to be controlled by said transmitted current when the fault is outside of said circuit portion for preventing said fault responsive means from effecting a circuit opening operation of said circuit interrupting means.

16. In a protective system for an electric power transmission system having a power transmission line including a section extending between a first station and a second station spaced therefrom on said line, circuit interrupting means at said stations connecting during operation the opposite ends of said line section into said line, fault responsive means at said first station for effecting opening of said circuit interrupting means on the occurrence of a fault on said line including a time delay overcurrent relay connected to be energized from said line, transmitter means at said second station for transmitting electric energy to said first station only upon occurrence of a fault outside said line section, and means at said first station actuated by transmitted electric energy from the second station and operative within the period of the time delay of the associated overcurrent relay for preventing said fault responsive means from effecting an opening of the circuit interrupting means at said first station.

17. In a protective system for an electric power transmission system having a power transmission line including a section extending between a pair of stations spaced from each other on said line, circuit interrupting means at each of said stations connecting during operation the opposite ends of said line sections into said line, fault responsive means at each of said stations for effecting opening of the associated interrupting means on the occurrence of a fault on said line including a time delay overcurrent relay connected to be energized from said line, transmitter means at each of said stations for transmitting electric energy to the station on the other end of said line section only upon occurrence of a fault outside said line section, and means at each of said stations actuated by transmitted electric energy from the station at the other end of said section and operative within the period of the time delay of the associated overcurrent relay for preventing said fault responsive means from effecting an opening of the circuit interrupting means at said first station.

18. A protective arrangement for an electric circuit including circuit interrupting means at one end of a portion of the circuit, fault responsive means at said end for effecting a circuit opening operation of said interrupting means on the occurrence of a fault on the circuit including a fault responsive time action relay connected to be energized from the circuit, means at the other end of said circuit portion for transmitting a current to said one end of said circuit portion only on the occurrence of a fault outside of said circuit portion and means at said one end responsive to said transmitted current and operative within the time action of said relay for preventing said fault responsive means from effecting a circuit opening operation of said circuit opening means.

19. A protective arrangement for an electric circuit including circuit interrupting means at one end of a portion of the circuit, fault responsive means for controlling the circuit opening operation of said interrupting means on the occurrence of a fault on the circuit including a fault responsive time action relay connected to be energized from the circuit, means at the other end of said circuit portion for transmitting an oscillation of a predetermined frequency, directional relay means at the other end of said circuit portion for controlling the operation of said transmitting means in accordance with the direction of flow of fault power at said end, receiving means at said one end tuned to the frequency of said transmitting means and means controlled by said receiving means and operative within the time action of said fault responsive relay for preventing said fault responsive means from effecting the opening of said circuit interrupting means when the fault is outside of said circuit portion.

JEAN FALLOU.